Nov. 29, 1966 S. J. MORRISSEY 3,288,499
ADJUSTABLE GUSSET STAY FOR SUPPORT STRUCTURES
Filed March 4, 1963 2 Sheets-Sheet 1
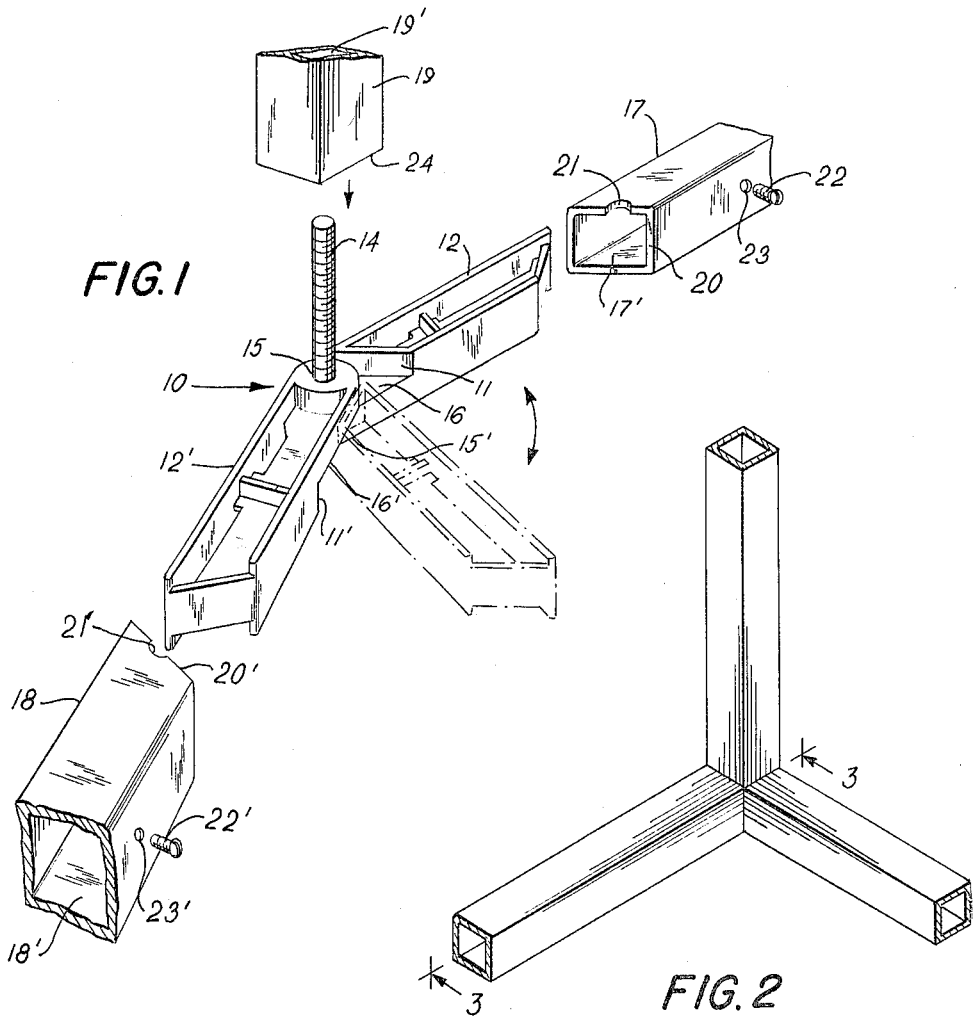
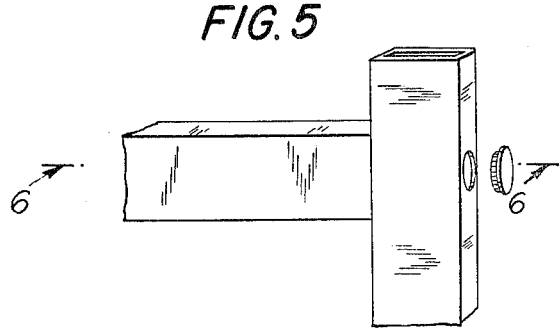
INVENTOR.
STUART J. MORRISSEY
BY
Kane, Dalsimer and Kane
ATTORNEYS

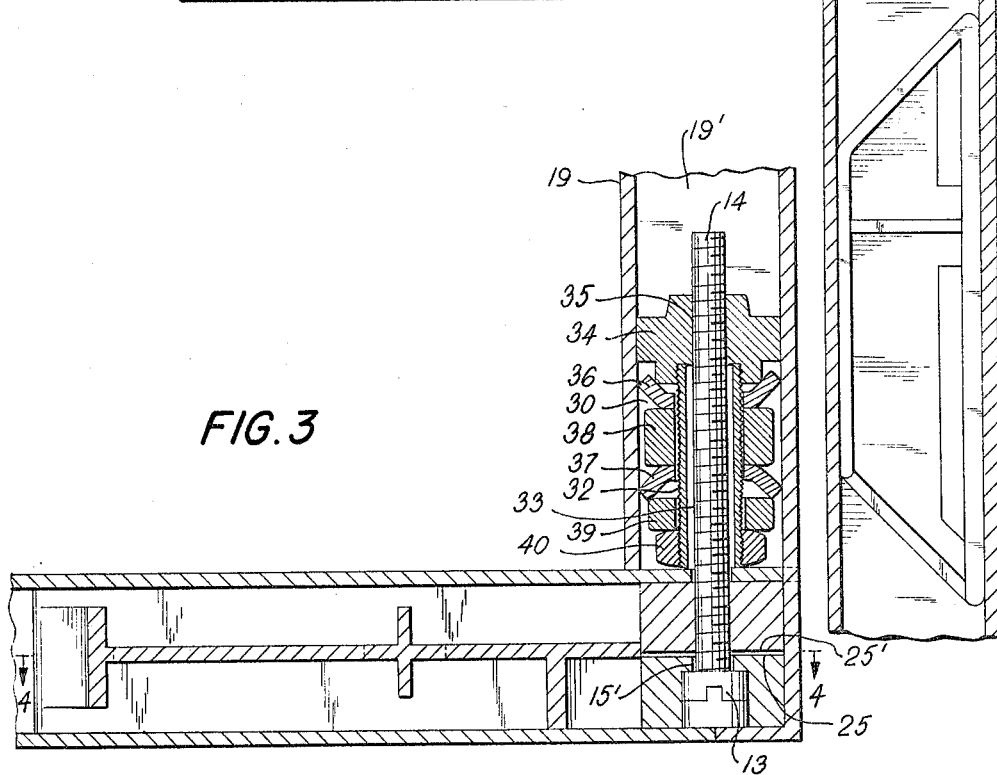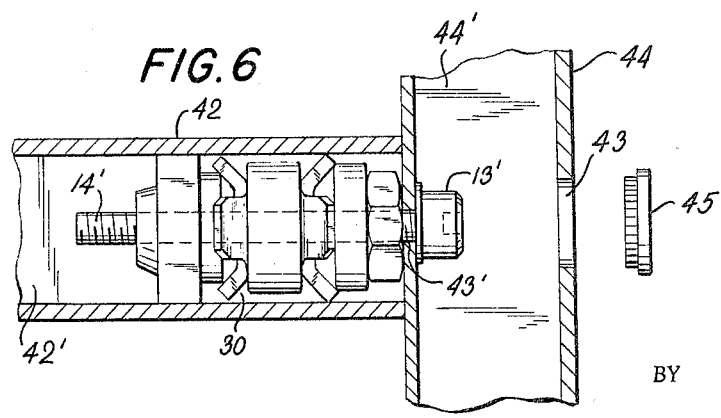

United States Patent Office 3,288,499
Patented Nov. 29, 1966

1

3,288,499
ADJUSTABLE GUSSET STAY FOR SUPPORT STRUCTURES
Stuart J. Morrissey, 28 Norwood Road, Port Washington, N.Y.
Filed Mar. 4, 1963, Ser. No. 262,506
5 Claims. (Cl. 287—54)

This invention relates to an adjustable gusset stay for support structures and more particularly, to an adjustable gusset stay in which structures such as machinery frames, partitions, displays, furniture frames and the like may be assembled.

In recent years the use of tubing for fabrication of support structures for machinery, furniture, partitions and the like have gained greater acceptance by the manufacturer and the consumer. Thus, many designs and shapes of structures are easily adaptable for the type of construction when using standard tubular stock components. However, many disadvantages and difficulties are presented when forming the joints of the desired structures. The joints are generally connected by a clamping device or welded so that disassembly is often not possible without destruction of the joint. The joints are generally the weakest part of the structure and need to be reinforced to insure a rigid joint. Skilled workmen are needed to weld and assemble the structures which materially add to their high initial cost of manufacture.

It is therefore an object of my invention to overcome the difficulties and disadvantages heretofore encountered and to provide an adjustable gusset stay for use in constructing joints for support structures or the like.

Another object of my invention is to provide an adjustable gusset stay in which a structure is readily assembled and disassembled, in which the joint is reinforced, which is sturdy, rigid and neat in appearance.

A further object of my invention is to provide a gusset stay which may be adjusted to any desired angle to form a joint in which it reinforces and adds support to the joint, in which welding of the joint is obviated, which is economical to assemble without employment of skilled workmen and which is inexpensive to manufacture.

My invention contemplates the use of an adjustable gusset stay for forming connections and joints with tubular members for constructing support structures. The gusset stay comprises a pair of pivotally mounted elongated members, means provided on said members to limit the angular displacement between the elongated members, means to releasably adjust the angle between the elongated members and means for locking the stay in fixed position so that when assembling a joint the stay is telescopically positioned within the bore of the tubular members and is adjusted to conform with the mitered edges thereof thus forming a reinforced rigidly constructed joint without the use of skilled workmen to weld or otherwise fasten the joint in rigid position.

With these objects in mind, reference is had to the drawings, in which:

FIG. 1 is an exploded view in perspective showing my gusset stay and the tubular parts therefor forming a joint;

FIG. 2 is a view in perspective showing an assembled joint of a tubular structure embodying my invention;

FIG. 3 is a cross-sectional view in side elevation taken on the line 3—3 of FIG. 2 showing a section of the gusset stay and anchoring means for holding the vertical tubular member in position;

FIG. 4 is a cross-sectional view taken on the line 4—4 of FIG. 3 showing my gusset stay having mounted thereon tubular members;

FIG. 5 is another embodiment of my invention showing a T joint in perspective; and FIG. 6 is a cross-sectional view taken on the line 6—6 of FIG. 5 showing my anchoring means therein.

My adjustable gusset stay is illustrated in a form showing the structure of a joint in detail. The gusset stay 10 comprises a pair of substantially equal elongated members 12 and 12', each having a central opening 15 and 15' at an end thereof. One of the central openings 15 positioned at an end of the member 12 is threaded to receive a bolt 14 and opening 15' is oversized and unthreaded so that member 12' may pivot freely about bolt 14 to prevent a lock-nut effect. To insure the gusset stay 10 of remaining in a fixed position after bolt 14 has been tightened faces 25 and 25' are provided with a series of interlocking ridges or serrations 26 so that the stay 10 will resist rotational movement when a force is applied thereto. Stop or limiting means 11 and 11' are provided on elongated members 12 and 12'. The stops 11 and 11' are formed obliquely and perpendicular to flanged surfaces 16 and 16'. Stops 11 and 11' extend approximately one-half the height of elongated members 12 and 12'. Stops 11 and 11' limit the adjustment of gusset stay 10 so that stay 10 is adjustable approximately from between 30° and 270°. Gusset stay 10, as illustrated in FIG. 1, is constructed in rectangular form and has dimensions slightly smaller than the bores 17' and 18' of tubular members 17 and 18, so that stay 10 when telescopically positioned in bores 17' and 18' of tubular members 17 and 18 do not rotate about elongated members 12 and 12'. Also, stay 10 will serve to reinforce the assembled joint. Tubular members 17 and 18 are provided having the desired mitered edge 20 and 20'. A pair of grooves 21 and 21', shown in FIG. 1, in the form of a semicircle are provided in tubular members 17 and 18 so that when the tubular members 17 and 18 are assembled by inserting the gusset stay 10 within bores 17' and 18', the bolt 14 will fit into the groove or openings 21 and 21'. The semicircular openings 21 and 21' are needed when a three-dimensioned joint is to be constructed as shown in FIG. 2. Thus, it can be seen that a frame may be constructed by providing similar assemblies of the type described at the end of each tubular member to form a desired shape, such as a rectangle or a square or any other desired design. Set screws 22 and 22' are removably fastened through the tubular members 17 and 18 through openings 23 and 23' so that the set screws 22 and 22' when rigidly fastened are biased against the faces of the elongated members 12 and 12' of stay 10 to insure a rigid connection of the joint. When a three-dimensional structure is desired bolt 14, shown in FIG. 1, is of sufficient length to be threadedly connected to an anchoring means 30 (to be described later) which is positioned within the bore 19' of tubing 19 and engages the walls of the bore 19' at such distance from the end of tubing 19 that the bottom edge 24 of tubing 19 biases against the faces of the tubular members 17 and 18, thus forming a rigid and reinforced three-dimensional joint. It can be seen by repeating the above procedure, the vertical risers of a structure may be mounted at each corner of the upper and lower frames.

To clamp the vertical risers in fixed position I provide an anchoring means 30 which includes a threaded member 32 having a bore 33 of slightly larger diameter than bolt 14. A nut 34 is provided having outside dimensions approximately equal to those of the inner bore 19' of tubing 19. Nut 34 has a central opening 35 in which threaded member 32 and bolt 14 are connected thereto. Slidably mounted on the threaded member 32 is a pair of lock washers 36 and 37 and interposed therebetween is a spacer or washer 38. Another washer 39 is slidably mounted and positioned against lock washer 37. To hold the assembly in place a nut 40 is threadedly connected to the threaded tubular member 32. Nut 40 compresses anchoring assembly 30 so that lock washers 36 and 37 are compressed thereby engaging bore 19' of tubular member 19. The anchoring assembly 30 is telescopically positioned within the bore 19' of tube 19 at a predetermined distance from end 24 and bolt 14 is inserted through opening 33 of anchoring means 30 and threadedly connected to nut 34 as shown in FIG. 3. Tubular member 19 is fastened so that edge 24 is biassed against the upper surfaces of tubular members 17 and 18. Tubular member 19 is held in place when sufficient pressure is put on anchoring means 30 by tightening bolt 14 through threaded nut 34. Also, nut 34 is rotated slightly so that the corners thereof are in frictional contact with the walls of bore 19' of tubular member 19, thus holding the vertical riser 19 in fixed position. It may readily be seen that the assembly or disassembly of the joint thus described may easily be performed by an unskilled workman.

In FIGS. 5 and 6 a T connection is illustrated as another type or form of joint. Tubular member 42 is fitted with anchoring means 30 as previously described. Tubular member 44 is provided with a pair of aligned openings 43 and 43'. Opening 43 has a diameter large enough for bolt 14' to pass through, and opening 41' is slightly larger than the diameter of the shank portion of bolt 14' so that bolt head 13' of bolt 14' will tighten against the inner wall of bore 44' of tubular member 44. Opening 43 is sealed with a pressure cap 45 which is removably mounted therein.

Materials that may be used in accordance with my invention may vary greatly and are a matter of choice depending upon the desired structure, such as aluminum, magnesium, steel of various types. However, I prefer to use cast aluminum for my gusset stay and tubular aluminum stock for the frame members. The size and shape of my gusset stay will vary in accordance with the size and shape of the tubular stock. I prefer to construct my gusset stay so that its dimensions are substantially equal to the bore of the tubular stock and may act to reinforce the joint and prevent lateral and rotational movement of the tubular stock relative thereto. As will be apparent, my anchoring means will vary according to the configuration of the tubular stock.

While I have described and illustrated an embodiment of my invention it should be understood that many changes and variations may be made without departing from the scope of my invention as defined by the appended claims.

I claim:

1. A joint for use in forming support structures comprising in combination with tubular structural members telescopically associated with an adjustable gusset stay and anchoring means to releasably secure said structural members in fixed position, said gusset stay including a pair of substantially complementary elongated members, each of said members having a flanged surface formed at an end thereof, said flanged portions disposed in overlapped face-to-face contact and the surfaces of said members adapted to lie substantially in the same plane, said flanges each having a bore formed transversely therethrough, means disposed in and extending through said bores for pivotally mounting said members, said structural tubular members being each provided with a groove at the end adjacent said pivotally mounting means, stop means formed on said elongated members for limiting the angular displacement between said elongated members, said gusset stay elongated members being telescopically positioned within the respective bores of said tubular members and being encased therein and means mounted on said tubular members for releasably securing said elongated member therein, said anchoring means encased in another tubular member and releasably engaging the inner surface thereof, said anchoring means including compressible members and fastening means for releasably securing said anchoring means onto said means for pivotally mounting said members in fixed locking position, thereby forming a three-dimensional joint for said support structure.

2. A joint as set forth in claim 1 wherein said means for pivotally mounting said elongated members comprises a threaded bolt disposed in said openings and threadedly connected therethrough for pivotally mounting said stay in fixed position and said bolt is threadedly connected to said anchoring means.

3. An adjustable gusset stay for use in forming connections with tubular structural members for constructing joints therewith comprising: a pair of substantially complementary elongated members, each of said members having a flange formed at an end thereof so that said flanged portions may be disposed in face-to-face contact and the surfaces of said members adapted to lie substantially in the same plane, said flanges being overlapped and each having a bore transversely therethrough, one of said bores having threads disposed therein, stop means formed on each of said members for limiting the angular displacement between said pair of elongated members, means disposed in said bores and threadedly engaging one of said bores for pivotally mounting said pair of elongated members and for releasably adjusting the angle between said members and to secure said members in fixed locking position, said pair of elongated members each encased within the respective bore of said tubular structural members, anchoring means which is adapted to be secured to another tubular structural member and which is releasably secured to said means for pivotally mounting said pair of elongated members in locked position, means mounted on said tubular structural members for releasably securing said elongated members with the respective bores of said tubular members and said tubular structural members being each provided with a groove at the end thereof adjacent said pivotally mounting means thereby accommodating a better fit of the three-dimensional joint formed thereby.

4. An adjustable gusset stay as claimed in claim 3 wherein said flanges are substantially one-half the thickness of said elongated members and the end surfaces of said flanges lie in substantial coaxial alignment with each other and wherein stop means are provided, said stop means being formed on said elongated members with one surface obliquely directed to the axis of said elongated members and with another surface which is perpendicular to the faces of each of said flanges, said stop means being positioned adjacent said pivotal mounting means to limit the angular displacement.

5. A joint for use in forming support structures comprising, in combination with tubular structural members, telescopically adjustable gusset stay elongated members and anchoring means to releasably secure said structural members in fixed position, said gusset stay elongated members each having a flanged surface formed at an end thereof, said flanged portions being disposed in overlapped face-to-face contact and the surfaces of said members adapted to lie substantially in the same plane, said flanges each having a bore formed transversely therethrough, means disposed in and extending through said bores for pivotally mounting said members, stop means formed on said elongated members for limiting the angular displacement between said elongated members, said gusset stay elongated members being telescopically positioned within the respective bores of said tubular members for releasably securing said elongated members therein, said anchoring means being encased in another tubular member and including a threaded tubular member, a pair of nuts positioned at opposite ends of said member and threadedly connected thereto, a pair of lock washers and a pair of spacer rings slideably positioned on said member in spaced relationship to each other and interposed between said nuts so that said washers are placed in compressive force by said nuts, said washers releasably engaging the inner surfaces of said tubular structure.

References Cited by the Examiner

UNITED STATES PATENTS

| | | | |
|---|---|---|---|
| 691,830 | 1/1902 | Whitley et al. | 287—14 X |
| 792,045 | 6/1905 | Johnson | 287—101 |
| 1,461,767 | 7/1923 | Weyrauch | 85—67 X |
| 1,753,183 | 4/1930 | Johnson | 85—67 X |
| 2,972,495 | 2/1961 | Yalen | 287—54 |
| 3,017,183 | 1/1962 | Chalcroft | 287—14 X |

FOREIGN PATENTS 499,156    11/1954    Italy.

THOMAS F. CALLAGHAN, *Primary Examiner.*

A. V. KUNDRAT, *Assistant Examiner.*